Jan. 10, 1956    H. S. KAUFMAN ET AL    2,729,967
METHOD AND APPARATUS FOR DETERMINING THE CHARACTERISTICS
OF A THERMOPLASTIC MATERIAL
Filed May 27, 1954    3 Sheets-Sheet 1

INVENTORS
HERMAN S. KAUFMAN
CARMEN R. GIANNOTTA
BY
ATTORNEYS

INVENTORS
HERMAN S. KAUFMAN
CARMEN R. GIANNOTTA
ATTORNEYS

INVENTORS
HERMAN S. KAUFMAN
CARMEN R. GIANNOTTA
ATTORNEYS

United States Patent Office
2,729,967
Patented Jan. 10, 1956

2,729,967

METHOD AND APPARATUS FOR DETERMINING THE CHARACTERISTICS OF A THERMOPLASTIC MATERIAL

Herman S. Kaufman, New York, N. Y., and Carmen R. Giannotta, North Caldwell, N. J., assignors to The M. W. Kellogg Company, Jersey City, N. J., a corporation of Delaware Application May 27, 1954, Serial No. 432,681

18 Claims. (Cl. 73—15.6)

This invention relates to a method and apparatus for determining the characteristics of a thermoplastic material. In one aspect, the invention relates to a method and apparatus for evaluating the grade or apparent molecular weight of thermoplastic materials. More particularly in this aspect, the invention relates to a method and apparatus for evaluating the grade or apparent molecular weight of solid moldable polymers of thermoplastic materials, as an aid in determining the molding requirements of such materials, for producing finished molded articles therefrom. Still more particularly in this aspect, the invention relates to a method and apparatus for evaluating the grade or apparent molecular weight of solid moldable polymers of trifluorochloroethylene and ethylene, as an aid in determining the molding requirements of these polymers, for producing finished molded articles therefrom.

Several methods have heretofore been suggested, for commercial use, for determining the characteristics of moldable thermoplastic materials, as evaluations of the grade or apparent molecular weight, as an aid in determining the molding requirements of these materials. Among the most widely commercially adopted methods for determining the aforementioned characteristics of moldable thermoplastic materials, is the no-strength-temperature method (N. S. T.) described in patents and technical literature. This method for determining the grade or apparent molecular weight of thermoplastic materials, however, has been found in practical commercial applications, to have several objectionable features. In one respect, the N. S. T. method has been found to degrade the thermoplastic material during measurement, particularly where higher molecular weight resins are being tested. In another respect, the N. S. T. method has been found to be cumbersome and comparatively slow, because of the relatively long periods of time required to complete the test. Furthermore, the chances for high degree of error are ever present, requiring constant, careful attention to the apparatus and conditions while conducting this test. Hence, prior to our invention, no satisfactory method has been found for the accurate and rapid determination of the characteristics of a thermoplastic material, and which can also be easily carried out without extensive manipulation on the part of the operator.

It is, therefore, an object of this invention to provide an improved method for evaluating the grade or apparent molecular weight of a thermoplastic material.

Another object of this invention is to provide improved apparatus for evaluating the grade or apparent molecular weight of a thermoplastic material.

Still another object of this invention is to provide an improved method and apparatus for carrying out an accurate and rapid evaluation of the grade or apparent molecular weight of a thermoplastic material, without extensive manipulation on the part of the operator.

Numerous other objects and advantages will become apparent to those skilled in the art from the accompanying description and disclosure.

For a full understanding of the nature and objects of this invention, reference should be had to the following detailed description taken in connection with the accompanying drawings, in which.

Figure 1:
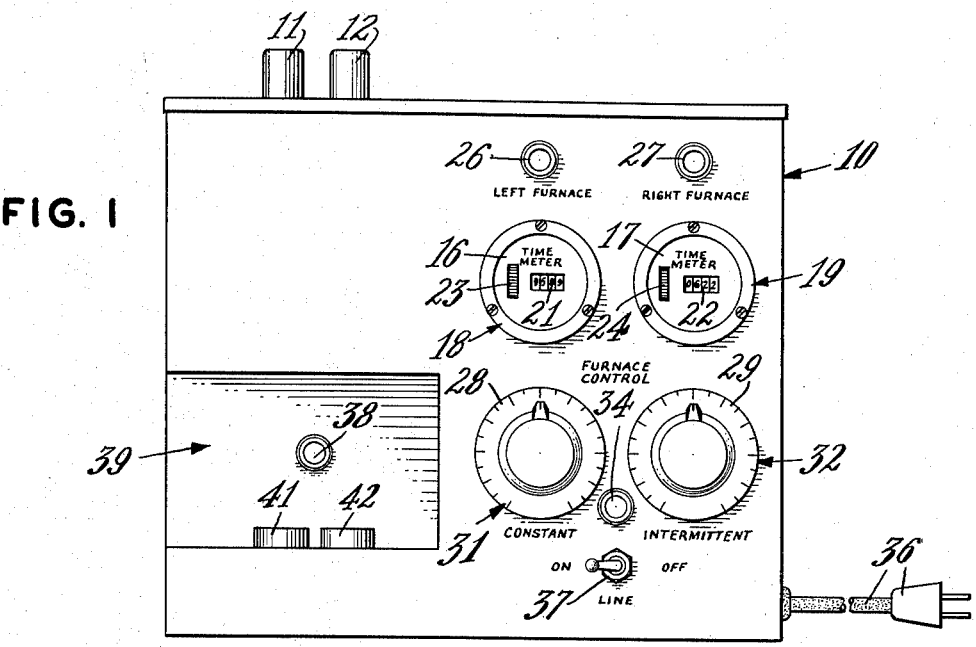
Figure 1 is a front elevational view, diagrammatically illustrating the improved apparatus for determining or evaluating the grade or apparent molecular weight of a thermoplastic material, according to the present invention.
Figure 2:
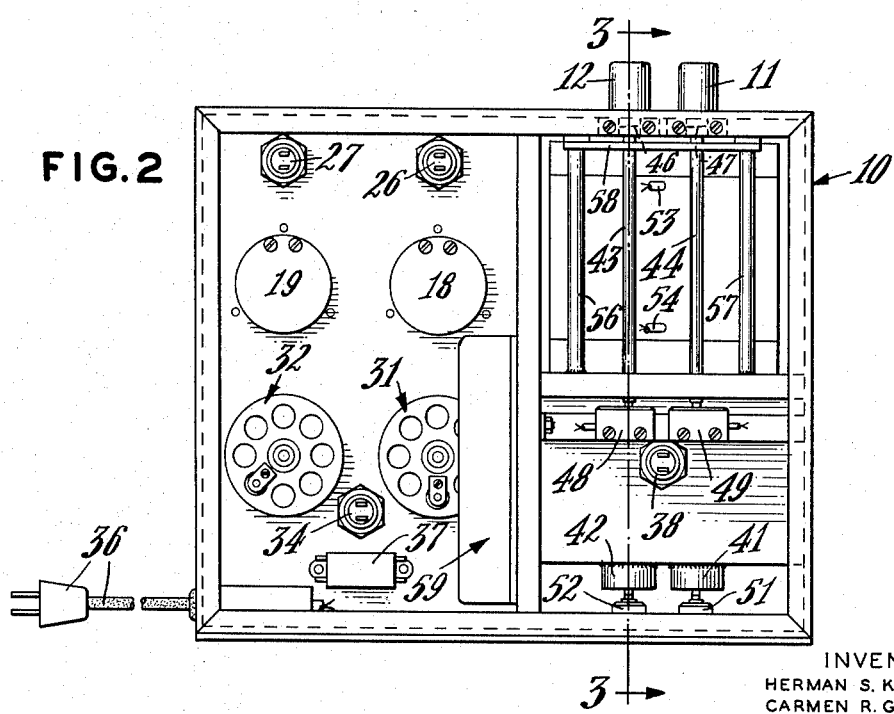
Figure 2 is a rear elevational view, diagrammatically illustrating the improved apparatus of the present invention with the cover and back-plate removed.
Figure 4:
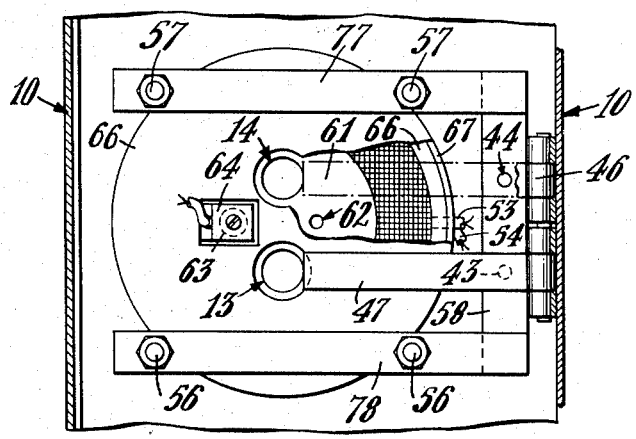
Figure 4 is a top plan view, taken along line 4—4 of Figure 3, with parts broken away.
Figure 5:
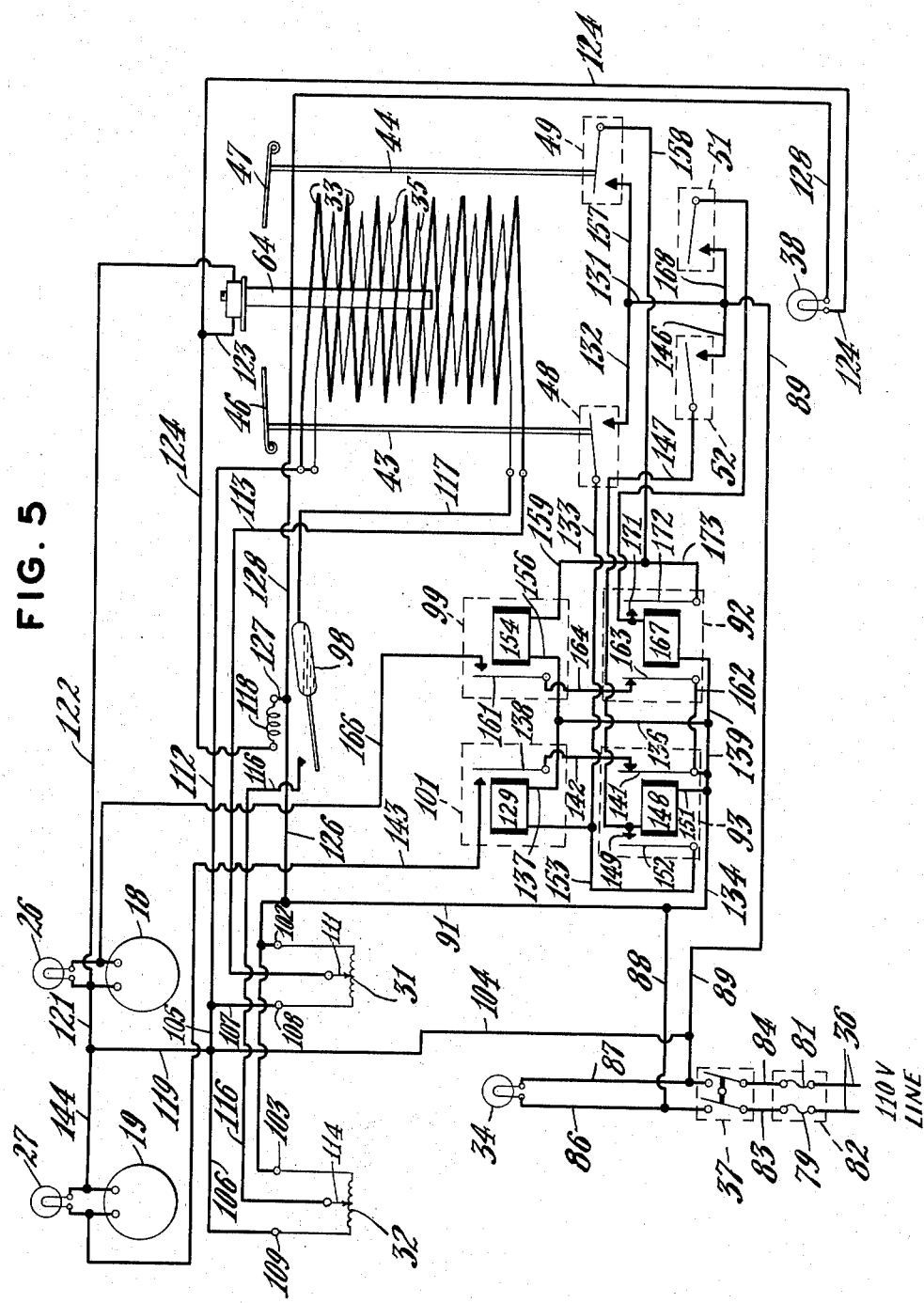
Figure 5 is a schematic wiring diagram of the improved apparatus of the present invention.

In Figure 1, which illustrates a front elevational view of one form of the arrangement of the improved apparatus of the present invention, numeral 10 designates the instrument case in which the apparatus is contained. Numerals 11 and 12 are specimen holders, adapted for attaching thereto a sample of the thermoplastic material at one end, and fitting into the top of their respective furnace-wells or heating zones, as shown by numerals 13 and 14, respectively, in Figure 4. Numerals 16 and 17 are the dial plates of timing meters 18 and 19, respectively, mounted behind the panel of instrument case 10, as shown in Figure 2, for recording elapsed heating time in furnace-wells 13 and 14. Timing meters 18 and 19 are equipped with seconds-indicator dials 21 and 22, and reset-knobs 23 and 24, respectively. Numerals 26 and 27 are pilot-light assemblies electrically associated with timing meters 18 and 19, respectively, to indicate that these timing meters are in operation. Numerals 28 and 29 are the adjustable dials of constant and intermittent variable auto transformers, or Variacs, 31 and 32, respectively, mounted behind the panel of instrument case 10, as shown in Figure 2, for maintaining proper temperature control in furnace-wells 13 and 14. Furnace-wells 13 and 14 are equipped with suitable electrical heating elements 33 and 35, as shown in Figure 5 of the drawings. Numeral 34 is an instrument pilot-light assembly, indicating that current is being supplied to the apparatus through power-line cord and plug 36. Numeral 37 is an on-off line switch associated with line-cord and plug 36. Numeral 38 is a pilot light in recessed chamber 39, electrically associated with heating element 33 of furnace-wells 13 and 14, which in turn are electrically associated with intermittent variable auto transformer 32 of Figure 2. Numerals 41 and 42 are removable receptacle cups positioned below specimen holders 11 and 12, respectively, positioned in the bottom of chamber 39.

In Figure 2, those portions of Figure 1 which have been previously discussed will not be referred to, since the purpose of Figure 2 is to show that portion of the apparatus which cannot be seen from the front elevational view of Figure 1. In Figure 2, numerals 43 and 44 are actuating rods, associated with actuating levers 46 and 47, respectively, as more fully shown in the enlarged sectional view of Figure 3 taken along line 3—3 of Figure 2. Numerals 48 and 49 are electrical starting micro-switches, positioned beneath and in contact with the lower ends of actuating rods 43 and 44, respectively. Numerals 51 and 52 are electrical shut-off micro-switches, positioned below and in contact with removable receptacle cups 41 and 42, respectively. Numerals 53 and 54 are the electrical terminals for heating elements 33 and 35, respectively, previously referred to, but not shown in Figure 2. Numerals 56 and 57 are furnace supports. Numeral 58 is a supporting bar for actuating rods 43 and 44. Numeral 59 is a relay rack for enclosing the relays hereinafter described.

Figure 3:
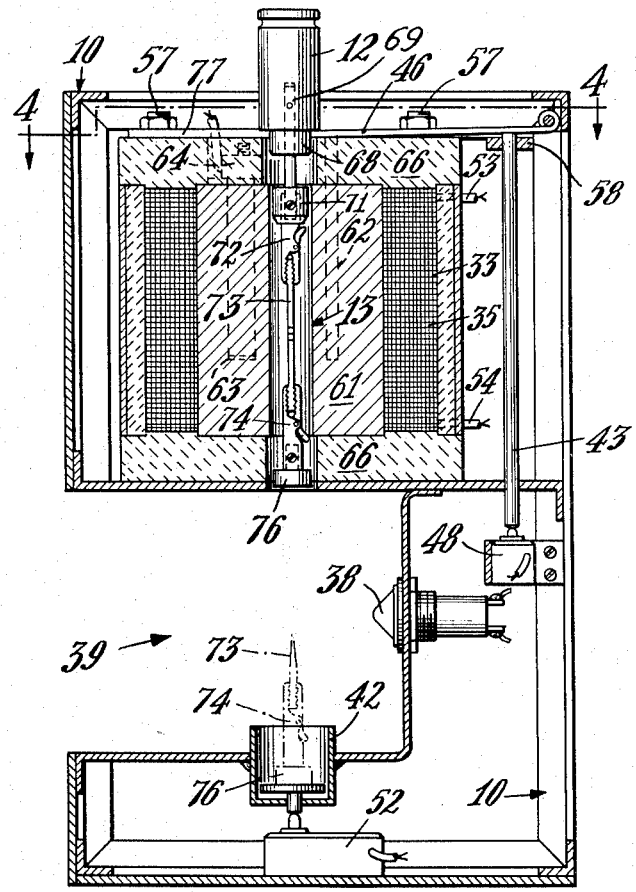
Figure 3 is an enlarged sectional view, in elevation, taken along line 3—3 of Figure 2.

In Figure 3 (which, as indicated above, is an enlarged section taken along line 3—3 of Figure 2) those portions of Figures 1 and 2 which have been previously discussed, will not be referred to. In Figure 3, numeral 61 is a metal frame block surrounding the furnace-well 14. Numeral 62 is a thermometer-well in furnace block 61. Numeral 63 is a thermo-regulator-well in furnace block 61, adapted to retain a thermo-regulator 64, as shown in Figure 4. Numeral 66 is a refractory material (e. g., expanded mica) surrounding furnace block 61. Numeral 67 is an insulating material (e. g., asbestos) surrounding the refractory material 66. The upper portion of specimen holder 12, previously referred to, is composed of a Transite-asbestos cement composition, and has a shoulder 68 adapted to engage actuating lever 46. In the upper portion of specimen holder 12, is embedded a brass rod 69. Attached to brass rod 69 and below shoulder 68, is a cylindrical brass block 71 adapted to close the top of furnace-well 14. Numeral 72 is a spring clip attached to brass block 71 and adapted to hold a specimen of the thermoplastic material. Numeral 73 is a standard notched specimen of the thermoplastic material, whose characteristics are being determined. This standard notched specimen may have the following dimensions (such as is used in the examples hereinafter discussed) viz, 0.062"±0.003" thick, 2" long and ⁹⁄₁₆" wide. The specimen is notched at the center. The cross-section of the specimen at the notch is 0.047± 0.001" wide by 0.062±0.003" thick. Numeral 74 is a spring clip with an additional weight 76 attached thereto to equal 7.5 grams, and is attached to the other end of specimen 73. As shown in Figure 4, certain elements of the apparatus are attached to the instrument case by mounting straps 77 and 78. Since the various elements comprising Figure 4 (which is a top plane view, taken along line 4—4 of Figure 3) have already been described in the discussion of Figures 1, 2 and 3, further description of this figure is, therefore, believed to be unnecessary.

In the schematic wiring diagram of the apparatus of Figure 5, line cord and plug 36 are connected to fuses 79 and 81 in fuse box 82. Fuses 79 and 81 are connected to line switch 37 through lines 83 and 84. The outlet side of line switch 37 is connected through lines 86 and 87, to pilot light 34, which indicates when the power is on.

Lines 88 and 89 supply power to the principal components of the tester, some of which have already been described and identified by numerals in preceding Figures 1 through 4. Note particularly timers 18 and 19, with their pilot lights 26 and 27, respectively, for two possible samples. Note also constant current Variac 31 and intermittent current Variac 32, which supply current, respectively, to constant current heating coil 33 and intermittent current heating coil 35.

The wiring diagram shows the following important components not previously described: mercury relay 98, which intermittently interrupts current flowing to intermittent current heating coil 35; starting relays 99 and 101 for starting timers 18 and 19, respectively; stopping and holding relays 92 and 93 for stopping timers 18 and 19, respectively, and for preventing the reuse of the timers until after removal of the melted samples.

Line potential from lines 88 and 89 is applied to Variacs 31 and 32, in parallel, by way of line 91 to connecting line 88 with terminals 102 and 103, and line 104 connecting line 89 by way of lines 105, 106 and 107 to terminals 108 and 109 of Variacs 31 and 32, respectively.

The voltage applied across Variac 31 between terminals 102 and 108 is divided by movable contact 111, at any point in Variac 31, which selects a portion of the voltage and applied it across the terminals of constant current heating coil 33 by way of lines 112 and 107, communicating with terminal 108, and line 113 communicating with movable contact 111.

Intermittent current Variac 32 is provided with a movable contact 114, which divides the line voltage applied between Variac terminals 103 and 109 and applies a desired portion thereof to intermittent current heating coil 35 by way of lines 106, 105 and 112, connecting with terminal 109, and line 116, mercury switch 98 and line 117 communicating with terminal 103 of intermittent current Variac 32.

The temperature within the heating zone enclosed by heating coils 33 and 35, having been approximately set by constant current Variac 31, is continuously maintained near the desired value, set by an adjustment on thermoregulator 64, by a periodic opening and closing of mercury switch 98, caused by magnetic actuating coil 118, through which current flows from line 89 via line 104, 119, 121, 122, adjustable thermo-regulator switch 64, line 123, and line 124; and with power line 88 by way of lines 91, 126 and 127. The intermittent flow of current in intermittent current heating coil 35 is indicated by pilot light 38, which flashes on or off every few minutes or every few seconds, depending on ambient temperatures, variations in line voltage, etc., and is connected across thermo-regulator switch 64 in parallel with actuating coil 118 by means of line 124 and lines 128 and 127.

The timing circuit is started, as previously described, when the insertion of a sample engages actuating lever 46, which closes switch 48 by means of actuating rod 43. This starts timer 19 and illuminates timer light 27 in the following manner: closing switch 48 energizes coil 129 of starting relay 101 by current passing from line 89 through line 131, line 132, switch 48, and line 133. The opposite end of coil 129 communicates with power supply line 88, via lines 134, 136 and 137. Energizing coil 129 pulls relay switch 138, within starting relay 101, to a closed position, which closes the timing circuit, as will be explained hereinafter. Current to timer 19 passes from line 88 through line 134, to junction 139 and then to switch 141 in stopping and holding relay 93 (which is in its normally closed position), through line 142, normally open switch 138 (now in its closed position), and line 143. Power line 89 is connected directly to timer 19 by way of lines 104, 119 and 144.

In a few seconds or few minutes, depending upon the properties of the test sample, the sample is melted and falls in receptacle cup 42, shown in Figure 2, thus closing stopping switch 52. This energizes stopping and holding relay 93, stops timer 19 and extinguishes pilot light 27 as follows: current from power line 89 passes through lines 131 and 146, switch 52 (now in its closed position), line 147, to coil 148 and to holding switch terminal 149; the opposite terminal of coil 148 being connected directly to power supply line 88 by way of lines 134 and 151. Energizing coil 148 simultaneously opens switch 141, thus stopping timer 19 by interruption of the current in its circuit, and closes holding switch 152, thus providing coil 148 with energizing current independently of switch 52. The independent source of current for switch 152 is traced from power supply line 89 by way of line 131, 132, switch 48 (which is still in a closed position as long as actuating lever 46 is held down by the presence of a sample holder), line 133 and line 153. Thus, when a melted sample is removed from cup 42, permitting switch 52 to open, coil 148, nevertheless, remains energized and prevents any restarting, which might occur because of the closure of switch 48, were this provision not made.

When the holder for the sample previously tested is removed from furnace-well 13 (see Figure 2), springably mounted lever 46 returns to its normal position and reopens switch 48 by means of rod 43. This simultaneously de-energizes both coil 129 of starting relay 101 and coil 148 of stopping and holding relay 93.

When the two samples are simultaneously tested, the sample holder in which the second sample is mounted engages actuating lever 47 and subsequently follows a cycle in every respect like that already described, but employing duplicate switches and relays for controlling timer 18 and corresponding pilot light 26. Switch 49 is closed by the downward thrust of rod 44, thus energizing coil 154 in starting relay 99, which connects to power line 88 by way of lines 134, 136 and 156, and to power line 89 by way of lines 131, 157, switch 49 (now closed), line 158, and line 159. The energizing of coil 154 closes normally open starting switch 161 in starting relay 99, thus starting timer 18 and illuminating pilot light 26 by the following circuit: power line 89 connects directly to timer 18 and pilot light 26 by way of lines 104, 119, and 121. Opposite terminals of timer 18 and light 26 connect with power line 88 by way of line 134, junction 139, line 162, normally closed switch 163 in stopping and holding relays 92, line 164, switch 161 (now closed) and line 166.

As previously described in connection with the timing circuit for timer 19, timer 18 is stopped and light 26 is extinguished when the sample supported by the holder engaging lever 47 melts and falls into receptacle cup 41 (shown in Figure 2) thereby closing switch 51. The circuit which effects this, is as follows: the closure of switch 51 energizes coil 167 in stopping and holding relay 92. Coil 167 is connected at one end directly to power line 88 by lines 139 and 134 and at the other end to power line 89 through lines 131 and 168, switch 51 (now closed), and line 169, which also communicates with holding switch terminal 171. The energizing of coil 167 simultaneously stops timer 18 and extinguishes light 26 by opening normally closed switch 163, and closes normally open switch 172 by bringing it into contact with switch terminal 171.

The closure of switch 172 provides coil 167 with power independently of switch 51, so that removal of the melted sample does not permit restarting of timer 18. Instead, coil 167 continues to receive current from line 88 by way of lines 134 and 139, and from line 89 by way of lines 131 and 157, switch 49 (still in a closed position), lines 158 and 173, switch 172 (now closed), and switch terminal 171. When the sample holder is removed from furnace-well 14 (see Figure 2), springably mounted lever 47 returns to its normal position and reopens switch 49 by means of rod 44. This simultaneously de-energizes both coil 154 of starting relay 99 and coil 167 of stopping and holding relay 92.

OPERATION

In determining the characteristics of a thermoplastic material, employing the method and apparatus of the present invention, line-cord and plug 36 are connected to a suitable electrical outlet, supplying 110–120 volts A. C. Line switch 37 is then thrown to the "on" position. Pilot light 34 will now operate indicating that current is being supplied to the apparatus through line-cord and plug 36. Dial 28 of constant current Variac 31, and dial 29 of intermittent current Variac 32, are so set as to maintain a substantially constant standard temperature in furnace-wells 13 and 14 for the particular thermoplastic material being tested, as more fully hereinafter discussed, and is measured by a thermometer inserted in thermometer-well 62. In this respect, it is preferred to set dial 28 of constant current Variac 31 at such position as to obtain an initial reading in the furnace-wells of approximately 5° C. below the desired standard temperature. Pilot light 38, in recessed chamber 39, will operate at such times as intermittent current Variac 32 is in operation, to indicate that current is being supplied to intermittent current Variac 32 to the furnace-wells, for additional heat. When pilot light 38 is not in operation, it is indicative that the temperature within the furnace-wells is maintained at the desired standard temperature and that additional heat from intermittent current Variac 32 is not being supplied. By means of rotating reset-knobs 23 and 24, the seconds-indicator dials 21 and 22 of timing meters 18 and 19, respectively, are preferably reset to zero, if necessary.

A standard notched specimen of the thermoplastic material (having the standard dimensions previously described) is fastened at one end by means of a spring clip, such as spring clip 72 in specimen holder 12. To the other end of this notched specimen is attached another spring clip having an additional weight attached thereto, if necessary, sufficient to equal a standard weight, employed in conjunction with the standard temperature (supra) assigned to a particular thermoplastic material. The total weight of spring clip 74 will be equal to this standard weight. The sample should so be inserted into spring clips 72 and 74 until the ends of the sample butt against the back of the clips, in order to insure a firm grip. The entire sample assembly comprising specimen 12 is then inserted into furnace-well 14, shoulder 68 engages actuating lever 46 causing actuating rod 43, which is attached thereto, to operate micro-switch 48 and thus set timing meter 18 in operation. When the timing meter is set in operation, pilot light 26 will also operate to indicate that the timing meter 18 is in operation.

Depending upon the particular characteristics of the thermoplastic material being investigated, after this material has been subjected to the aforementioned standard temperature in the furnace-well, for a sufficient length of time, the specimen will break at the notch, and the spring clip with the weight attached thereto and the broken portion of the thermoplastic specimen, will drop into the receptacle cup 42 positioned below the specimen holder 12, in the bottom of recessed chamber 39. As the weighted clip holding the broken portion of the thermoplastic specimen drops into receptacle cup 42, the electrical shut-off micro-switch 52 is set into operation by the falling weight and the timer 18 is automatically stopped, causing the pilot light 26 to go out. The reading in seconds, is then taken from the seconds-indicator dial 21 of the timing meter 18. It should be noted, of course, that the aforementioned description with reference to the operation of the apparatus when specimen holder 12 and its associated elements are employed, is also applicable to the operation when either specimen holders 12 or 11, or both are employed with their respective associated elements. In this manner, any number of thermoplastic specimens may be tested for their apparent molecular weight characteristics with rapidity.

As previously indicated, a substantially constant standard temperature is maintained in furnace-wells 13 and 14, depending upon the particular thermoplastic material being tested. In general, we have found that for most thermoplastic materials, the standard temperatures, assigned to these materials, which will be maintained within the furnace-wells, will fall within the range between about 80° C. and about 350° C., and preferably between about 100° C. and about 300° C. Likewise, a standard weight is assigned to and comprises the mass of spring clip 74, attached to the lower end of the specimen, for a particular thermoplastic material. Preferably, this weight will fall within the range between about 2.5 grams and about 7.5 grams. In each instance, there should be established a standard constant furnace temperature and a standard weight on spring clip 74, which is attached to the lower end of the notched specimen, for each thermoplastic material tested, as is illustrated in the examples hereinafter given. For most thermoplastic materials the time required for the notched specimen to break, when maintained at a standard temperature within the aforementioned range, and with a standard weight between about 2.5 grams and about 7.5 grams comprising the mass of spring clip 74, will be between about 100 and 1000 seconds.

The following examples will serve to illustrate but are not intended in any way to limit the apparatus or the process of the present invention for a rapid, effective method for ascertaining the grade or apparent molecular weight of a thermoplastic material.

Example I

A notched specimen of thermoplastic polytrifluorochloroethylene having the standard dimensions previously described, and having a molecular weight of about 100,000, corresponding to an N. S. T. value of 312, was fastened to a specimen holder of the above-described apparatus of the present invention, in which the total pull or weight of the spring clip on the lower portion of the specimen was 7.5 grams. This sample holder and specimen was next inserted in a furnace-well of the apparatus, in which, by previous adjustment of the constant and intermittent current Variacs (as previously described) was maintained at a constant temperature of 250° C.±2° C. Upon the insertion of the specimen holder into the furnace-well, the corresponding timing meter (previously set at zero) was set into operation, as previously described. The time required for this sample to break at the notch and cause the timing meter to stop, was read from the timing meter dial and was found to be 510 seconds.

Example II

A notched specimen of thermoplastic polyethylene having a molecular weight of about 23,000 and having the standard dimensions previously described, was fastened to a specimen holder of the above-described apparatus of the present invention, in which the total pull or weight of the spring clip on the lower portion of the specimen was 2.5 grams. This sample holder and specimen was inserted in a furnace-well of the apparatus, in which, by adjustment of the constant and intermittent current Variacs (as previously described) was maintained at a constant temperature of 130° C.±2° C. Upon insertion into the furnace-well, the timing meter (previously set at zero) was set into operation, as previously described. The time requirement for the sample to break at the notch and cause the timing meter to stop, was read from the timing meter dial and was found to be 283 seconds.

As previously described, the N. S. T. method heretofore employed for determining the grade or apparent molecular weight of moldable thermoplastic materials, in addition to the objectionable features of tending to degrade the thermoplastic material during measurement and requiring constant attention to the apparatus and conditions for conducting this test, which increase the chance of error, has also been found to be comparatively slow, because of the relatively long periods of time required to complete the test. On the other hand, the method for evaluating the grade or apparent molecular weight of moldable thermoplastic materials of the present invention, results in being able to carry out this determination in an accurate and rapid manner, and without extensive manipulation on the part of the operator. With this in mind, the following comparative data have been obtained in which both the N. S. T. test of the prior art and the test of the improved method of the present invention are set forth in the following table for purposes of comparison, with reference to the amount of time required to obtain a determination of the grade or apparent molecular weight of standard notched samples, having the aforementioned dimensions, of thermoplastic polymers of trifluorochloroethylene.

| Sample No. | N. S. T. | Time to Complete N. S. T. Test, Seconds | Time to Complete Present Test, Seconds |
| --- | --- | --- | --- |
| 1 | (228) | 520 | 115 |
| 2 | (248) | 1,320 | 160 |
| 3 | (281) | 2,640 | 262 |
| 4 | (312) | 3,880 | 510 |
| 5 | (323) | 4,320 | 860 |

It is to be understood that the form of our invention, herewith shown and described, is to be taken as a preferred example of the process and apparatus thereof, and that various changes in shape, size and in the arrangement of the components comprising the apparatus, may be resorted to without departing from the spirit or the scope of this invention.

We claim:

1. A method for determining the characteristics of a thermoplastic material, which comprises: suspending, at one end, an elongated specimen of a thermoplastic material, notched between the ends thereof, in a heating zone; pulling the other end of said thermoplastic specimen at a constant tension; maintaining a substantially constant temperature in said heating zone which is between the softening temperature of said thermoplastic material and below the temperature of substantial degradation; and measuring the period of time required for said thermoplastic specimen to pull apart at the notched portion thereof at said temperature.

2. A method for determining the characteristics of a thermoplastic material, which comprises: suspending, at one end, an elongated specimen of a thermoplastic material, notched between the ends thereof, in a heating zone; pulling the other end of said thermoplastic specimen at a constant tension corresponding to a weight of 7.5 grams; maintaining a substantially constant temperature in said heating zone which is between the softening temperature of said thermoplastic material and below the temperature of substantial degradation; and measuring the period of time required for said thermoplastic specimen to pull apart at the notched portion thereof at said temperature.

3. A method for determining the characteristics of a thermoplastic material, which comprises: suspending, at one end, an elongated specimen of a thermoplastic material, notched between the ends thereof, in a heating zone; pulling the other end of said thermoplastic specimen at a constant tension; maintaining a substantially constant temperature in said heating zone between about 80° C. and about 350° C.; and measuring the period of time required for said thermoplastic specimen to pull apart at the notched portion thereof at said temperature.

4. A method for determining the characteristics of a thermoplastic material, which comprises: suspending, at one end, an elongated specimen of a thermoplastic material, notched between the ends thereof, in a heating zone; pulling the other end of said thermoplastic specimen at a constant tension; maintaining a substantially constant temperature in said heating zone between about 100° C. and about 300° C.; and measuring the period of time required for said thermoplastic specimen to pull apart at the notched portion thereof at said temperature.

5. A method for determining the characteristics of a thermoplastic material, which comprises: suspending, at one end, an elongated specimen of a thermoplastic material, notched between the ends thereof, in a heating zone; pulling the other end of said thermoplastic specimen at a constant tension corresponding to a weight of 7.5 grams; maintaining a substantially constant temperature in said heating zone between about 80° C. and about 350° C.; and measuring the period of time required for said thermoplastic specimen to pull apart at the notched portion thereof at said temperature.

6. A method for determining the characteristics of a thermoplastic material, which comprises: suspending at one end, an elongated specimen of a thermoplastic material, notched between the ends thereof, in a heating zone; pulling the other end of said thermoplastic specimen at a constant tension corresponding to a weight of 7.5 grams; maintaining a substantially constant temperature in said heating zone between about 100° C. and about 300° C.; and measuring the period of time required for said thermoplastic specimen to pull apart at the notched portion thereof at said temperature.

7. A method for determining the characteristics of a thermoplastic material comprising a solid polymer of trifluorochloroethylene, which comprises: suspending, at one end, an elongated specimen of said thermoplastic material, notched between the ends thereof, in a heating zone; pulling the other end of said thermoplastic specimen at a constant tension; maintaining a substantially constant temperature in said heating zone which is between the softening temperature of said thermoplastic material and below the temperature of substantial degradation; and measuring the period of time required for said thermoplastic specimen to pull apart at the notched portion thereof at said temperature.

8. A method for determining the characteristics of a thermoplastic material comprising a solid polymer of trifluorochloroethylene, which comprises: suspending, at one end, an elongated specimen of said thermoplastic material, notched between the ends thereof, in a heating zone; pulling the other end of said thermoplastic specimen at a constant tension corresponding to a weight of 7.5 grams; maintaining a substantially constant temperature in said heating zone which is between the softening temperature of said thermoplastic material and below the temperature of substantial degradation; and measuring the period of time required for said thermoplastic specimen to pull apart at the notched portion thereof at said temperature.

9. A method for determining the characteristics of a thermoplastic material comprising a solid polymer of trifluorochloroethylene, which comprises: suspending, at one end, an elongated specimen of said thermoplastic material, notched between the ends thereof, in a heating zone; pulling the other end of said thermoplastic specimen at a constant tension corresponding to a weight of 7.5 grams; maintaining a substantially constant temperature in said heating zone of about 250° C.; and measuring the period of time required for said thermoplastic specimen to pull apart at the notched portion thereof at said temperature.

10. A method for determining the characteristics of a thermoplastic material comprising a solid polymer of ethylene, which comprises: suspending, at one end, an elongated specimen of said thermoplastic material, notched between the ends thereof, in a heating zone; pulling the other end of said thermoplastic specimen at a constant tension; maintaining a substantially constant temperature in said heating zone which is between the softening temperature of said thermoplastic material and below the temperature of substantial degradation; and measuring the period of time required for said thermoplastic specimen to pull apart at the notched portion thereof at said temperature.

11. A method for determining the characteristics of a thermoplastic material comprising a solid polymer of ethylene, which comprises: suspending, at one end, an elongated specimen of said thermoplastic material, notched between the ends thereof, in a heating zone; pulling the other end of said thermoplastic specimen at a constant tension corresponding to a weight of 2.5 grams; maintaining a substantially constant temperature in said heating zone which is between the softening temperature of said thermoplastic material and below the temperature of substantial degradation; and measuring the period of time required for said thermoplastic specimen to pull apart at the notched portion thereof at said temperature.

12. A method for determining the characteristics of a thermoplastic material comprising a solid polymer of ethylene, which comprises: suspending, at one end, an elongated specimen of said thermoplastic material, notched between the ends thereof, in a heating zone; pulling the other end of said thermoplastic specimen at a constant tension corresponding to a weight of 2.5 grams; maintaining a substantially constant temperature in said heating zone of about 130° C.; and measuring the period of time required for said thermoplastic specimen to pull apart at the notched portion thereof at said temperature.

13. Apparatus for determining the characteristics of a thermoplastic material, which comprises in combination: an elongated heating vessel having a passageway extending vertically therethrough adapted to have said thermoplastic material suspended therein; means for heating said vessel; thermostat means responsive to the temperature in the interior of said vessel for controlling said heating means and maintaining a substantially constant temperature in said vessel; means for insulating said vessel; a base member; means for fixing said heating vessel in a vertical position above said base member; time registering means; means responsive to the introduction of said thermoplastic material into said passageway for starting said time registering means; and means for stopping said time registering means actuated by the falling of said thermoplastic material through said passageway.

14. Apparatus for determining the characteristics of a thermoplastic material, which comprises in combination: a cylindrical elongated heating vessel having a passageway extending vertically therethrough adapted to have said thermoplastic material suspended therein; electrical means for heating said vessel; means for supplying an electric current to said heating means; an electrical thermostat responsive to the temperature in the interior of said vessel for controlling said heating means and maintaining a substantially constant temperature in said vessel; means for insulating said vessel; a base member; means for fixing said heating vessel in a vertical position above said base member; time registering means; means responsive to the introduction of said thermoplastic material into said passageway for starting said time registering means; and means for stopping said time registering means actuated by the falling of said thermoplastic material through said passageway.

15. Apparatus for determining the characteristics of a thermoplastic material, which comprises in combination: a cylindrical elongated heating vessel having a passageway extending vertically therethrough adapted to have said thermoplastic material suspended therein; electrical means for heating said vessel; means for supplying an electric current to said heating means; an electrical thermostat responsive to the temperature in the interior of said vessel for controlling said heating means and maintaining a substantially constant temperature in said vessel; means for insulating said vessel; a flat base-plate having a recess therein; a receptacle positioned within said recess; means for fixing said heating vessel in a vertical position above said receptacle; time registering means; means responsive to the introduction of said thermoplastic material into said passageway for starting said time registering means; and means for stopping said time registering means positioned in the recess of said base-plate below said receptacle and actuated by the falling of said thermoplastic material through said passageway.

16. Apparatus for determining the characteristics of a thermoplastic material, which comprises in combination: a cylindrical elongated heating vessel having a passageway extending vertically therethrough adapted to have said thermoplastic material suspended therein; an electrical heating element surrounding said heating vessel; an adjustable transformer for supplying an electrical current to said heating element; means for connecting said transformer to a source of alternating current; an electrical thermostat responsive to the temperature in the interior of said vessel for controlling said heating element and maintaining a substantially constant temperature in said vessel; means for insulating said vessel; a flat base-plate having a recess therein; a receptacle positioned within said recess; means for fixing said heating vessel in a vertical position above said receptacle; time registering means; means responsive to the introduction of said thermoplastic material into said passageway for starting said time registering means; and means for stopping said time registering means positioned in the recess of said base-plate below said receptacle and accuated by the falling of said thermoplastic material through said passageway.

17. Apparatus for determining the characteristics of a thermoplastic material, which comprises in combination: a cylindrical elongated heating vessel having a passageway extending vertically therethrough adapted to have a specimen of a thermoplastic material suspended therein at one end thereof; means for pulling the other end of said thermoplastic specimen at a constant tension; an electrical heating element surrounding said heating vessel; an adjustable transformer for supplying an electrical current to said heating element; means for connecting said transformer to a source of alternating current; an electrical thermostat responsive to the temperature in the interior of said vessel for controlling said heating element and maintaining a substantially constant temperature in said vessel; means for insulating said vessel; a flat base-plate having a recess therein; a receptacle positioned within said recess; means for fixing said heating vessel in a vertical position above said receptacle; electrical means for registering time in seconds; means responsive to the introduction of said thermoplastic material into said passageway for starting said time registering means; and electrical means for stopping said time registering means positioned in the recess of said base-plate below said receptacle and actuated by the falling of said thermoplastic material through said passageway.

18. Apparatus for determining the characteristics of a thermoplastic material, which comprises in combination: a cylindrical elongated heating vessel having a passageway extending vertically therethrough adapted to have said thermoplastic material suspended therein; an electrical heating element surrounding said heating vessel; an adjustable transformer for supplying an electrical current to said heating element; means for connecting said transformer to a source of alternating current; an electrical thermostat responsive to the temperature in the interior of said vessel for controlling said heating element and maintaining a substantially constant temperature in said vessel; means for insulating said vessel; a flat base-plate having a recess therein; a receptacle positioned within said recess; means for fixing said heating vessel in a vertical position above said receptacle; electrical means for registering time in seconds; a first electrical micro-switch responsive to the introduction of said thermoplastic material into said passageway for starting said time registering means; a first electrical relay connected to said time registering means and said first micro-switch; a second electrical micro-switch for stopping said time registering means positioned in the recess of said base-plate below said receptacle and actuated by the falling of said thermoplastic material through said passageway; and a second electrical relay connected to said second micro-switch and said time registering means.

References Cited in the file of this patent

UNITED STATES PATENTS

| | | |
|---|---|---|
| 2,375,034 | Semchyshen | May 1, 1945 |
| 2,479,984 | Stock | Aug. 23, 1949 |
| 2,579,424 | Gehman | Dec. 18, 1951 |
| 2,670,624 | Faris | Mar. 2, 1954 |